Oct. 28, 1958     B. L. NIKKEL     2,857,946
FORAGE CUTTER AND BLOWER
Filed Feb. 9, 1956     5 Sheets-Sheet 1
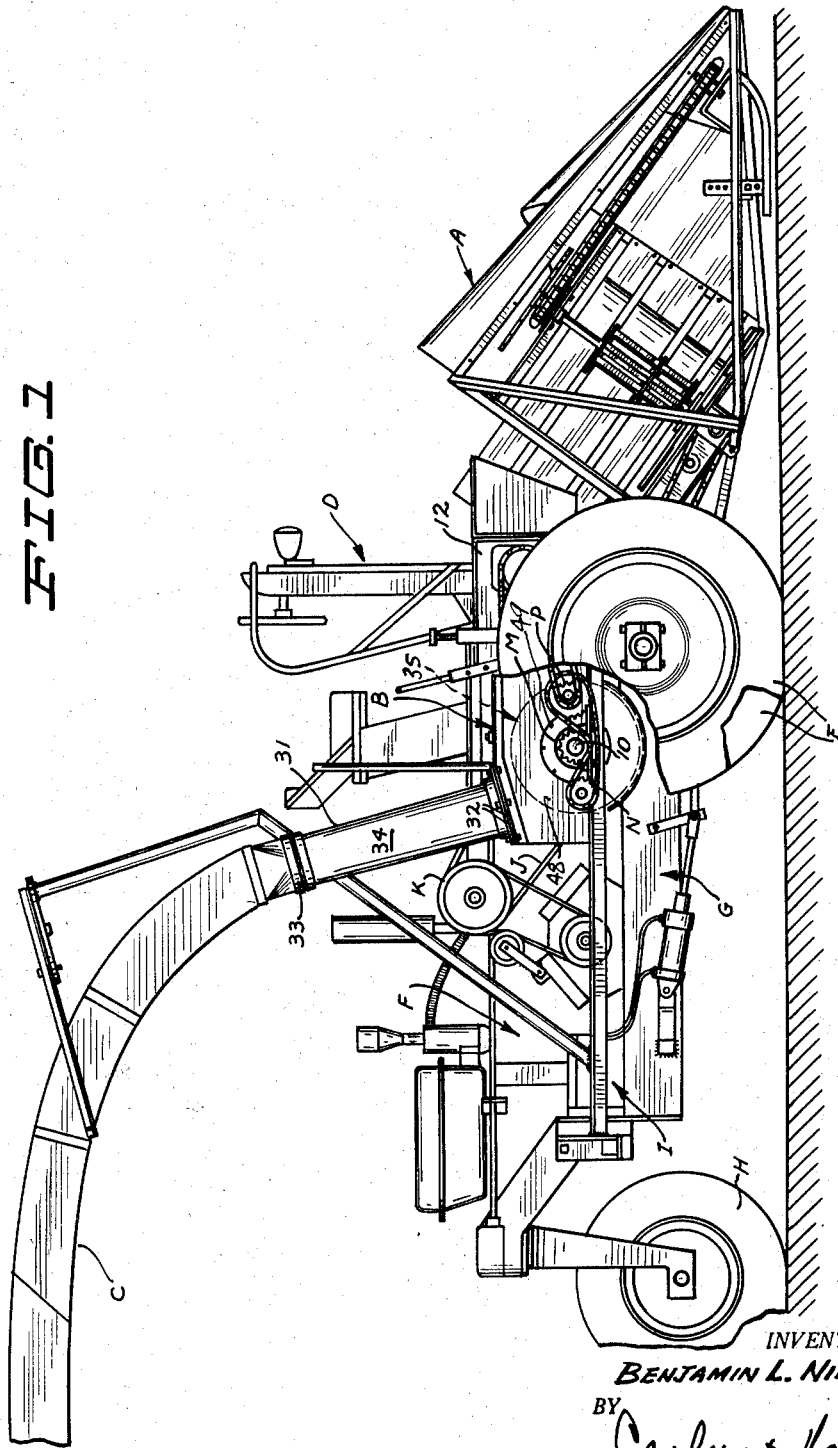
INVENTOR.
BENJAMIN L. NIKKEL
BY
ATTORNEYS Oct. 28, 1958     B. L. NIKKEL     2,857,946
FORAGE CUTTER AND BLOWER
Filed Feb. 9, 1956     5 Sheets-Sheet 2
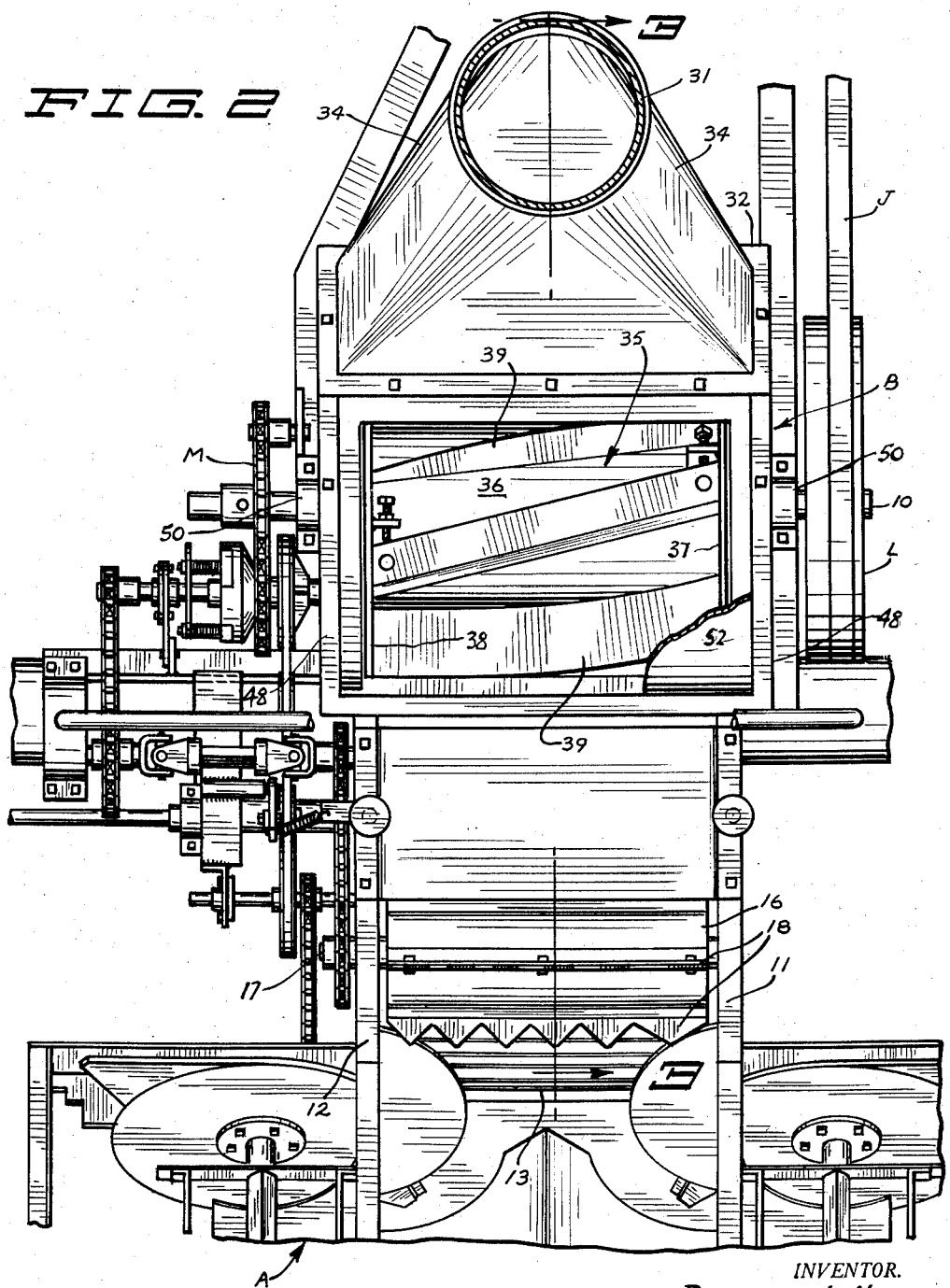
INVENTOR.
BENJAMIN L. NIKKEL
BY Carlsen & Eagle
ATTORNEYS Oct. 28, 1958     B. L. NIKKEL     2,857,946
FORAGE CUTTER AND BLOWER
Filed Feb. 9, 1956     5 Sheets-Sheet 3

INVENTOR.
BENJAMIN L. NIKKEL
BY
Carlsen + Hagle
ATTORNEYS

Oct. 28, 1958 B. L. NIKKEL 2,857,946
FORAGE CUTTER AND BLOWER
Filed Feb. 9, 1956 5 Sheets-Sheet 4

INVENTOR.
BENJAMIN L. NIKKEL
BY
Carlsen + Hoyle
ATTORNEYS

Oct. 28, 1958     B. L. NIKKEL     2,857,946
FORAGE CUTTER AND BLOWER
Filed Feb. 9, 1956     5 Sheets-Sheet 5

INVENTOR.
BENJAMIN L. NIKKEL
BY
ATTORNEYS

United States Patent Office 2,857,946
Patented Oct. 28, 1958

2,857,946

FORAGE CUTTER AND BLOWER

Benjamin L. Nikkel, Windom, Kans.

Application February 9, 1956, Serial No. 564,469

5 Claims. (Cl. 146—107)

My invention relates generally to improvements in ensilage or forage harvesting machines wherein forage crops such as corn and the like are harvested and reduced to small fragments for storage and use as silage, and more particularly to those components of such machines by which the crop is reduced or comminuted and then blown out through a discharge spout for delivery from the machine and transport to the place of storage.

The primary object of my invention is to provide an improved light-weight small sized and efficient combination cutter and blower of a construction such that it will operate at high efficiency and therefore will have a high operating capacity for its size. Another object is to provide a cutter and blower assembly having an improved rotor and housing, the former having spiral cutting knives and spiral blower blades, along with radial, auxiliary blower blades or fins on its opposite sides or ends, cooperating with a housing having apertured sides with air intakes, and a discharge spout tapering at its opposite sides upwardly therefrom. The main spiral blades blow the cut forage outward through the spout and the tendency towards formation of back drafts or eddies along the tapered sides of the spout, which would retard the discharge of the material causing it to back up in and clog the cutter itself, is prevented by the auxiliary radial blades on the opposite sides of the rotor. These auxiliary blades create air streams which travel outwardly through the spout along its tapered sides and thus assist in the delivery of the material and add to the overall velocity imparted to the cut material as it is cast out said chute. Still another object of my invention is to provide a cutter and blower rotor which is arranged for rotation on a substantially horizontal axis extending transversely with respect to the direction in which the uncut forage material is fed into the rotor and the cut material discharged therefrom, by contrast with the more usual location of such axis parallel with the path of material flow into the cutter. This arrangement presents what may be referred to as the peripheral portion or aspect of the blower-cutter rotor to the material as it is fed thereinto and the blower blades and knives extend generally parallel to the axis of rotation although they are spirally curved to assist in their operation as aforesaid. I find this construction and arrangement to provide an efficiency and capacity such as required for handling a large volume of forage material, in a compact, inexpensive and very durable assembly.

These and other more detailed and specific objects will be disclosed in the course of the following specification, reference being had to the accompanying drawings, in which—

Fig. 1 is a side elevation, with parts cut away, of a forage harvester in which is incorporated the improved forage cutter and blower making up my present invention.

Fig. 3 is a longitudinal vertical sectional view along the line 3—3 in Fig. 2 and through that portion of the machine best shown in Fig. 2.

Figure 2:
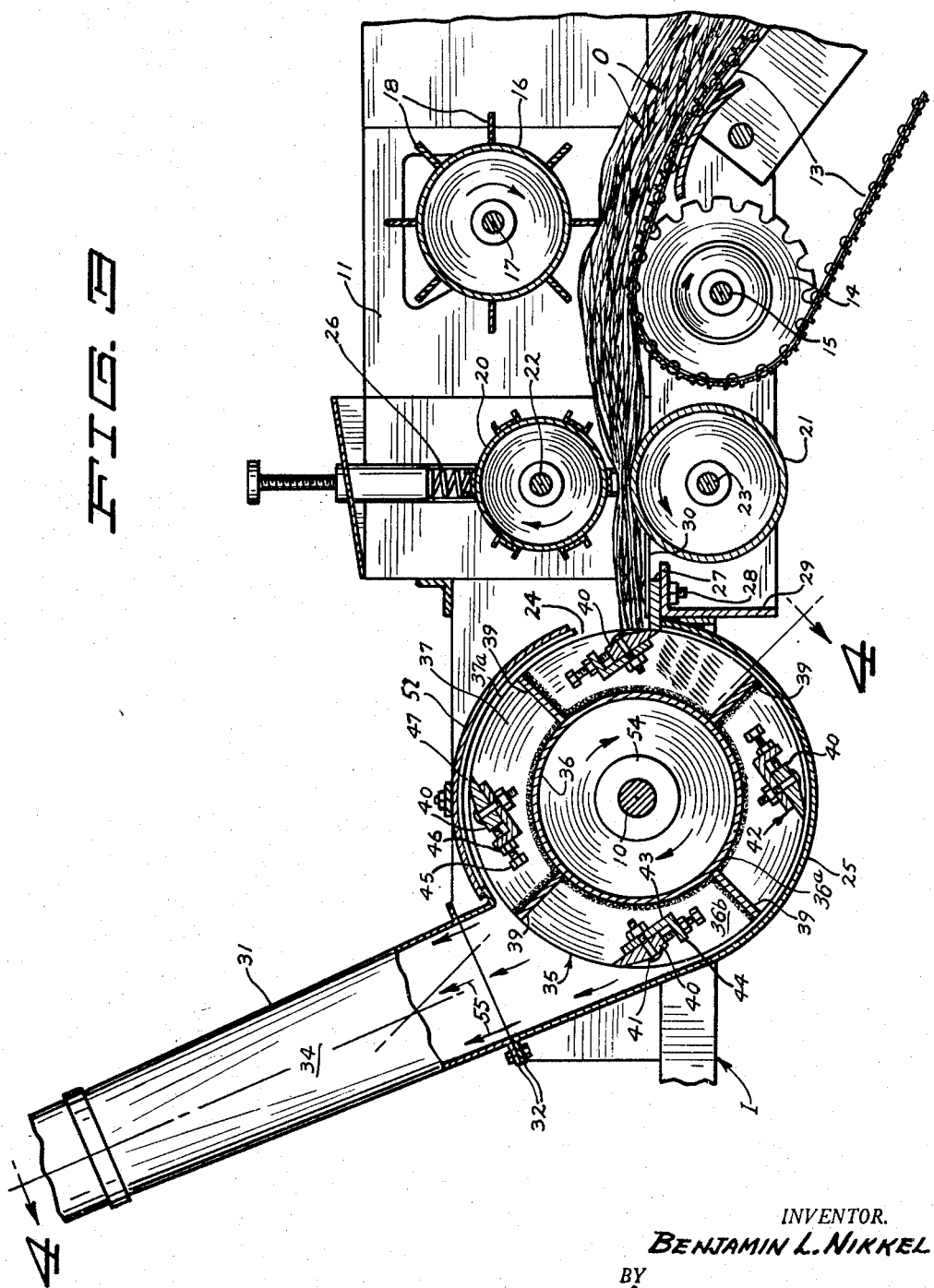
Fig. 2 is an enlarged top plan view of a central portion of the harvester, with some parts removed and others broken away, particularly showing the forage cutter and blower and associated components of the machine with the front and rear ends thereof broken away and the discharge spout shown in horizontal section.

As is customary in machines of this general nature the same comprises a forwardly located harvester unit, designated generally at A and by which unit A the corn or other forage crop is harvested and delivered in a rearward direction to the forage cutter and blower unit, designated generally at B which functions to chop up the material into fine particles and discharge the same through an adjustable pipe C into a wagon or truck (not shown) for transport to the point of storage. This general arrangement, of course, is that employed where the machine is one which travels over the field to harvest and chop the forage crop, although I do not necessarily limit myself to this traveling type of machine since the cutter-blower unit might also be employed in a stationary machine into which the forage material is fed in any suitable manner, as will be readily understood. For convenience in making this disclosure I have shown the machine as mounted upon a novel form of tractor identical with that shown in Patent No. 2,524,083, issued October 3, 1950 for Tractor and Means for Detachably Mounting an Agricultural Implement Thereon. Here again I do not limit myself to this particular type of mounting since the cutter and blower unit might also be embodied in a pull-behind type of implement if so desired.

So far as material to the present disclosure is concerned the tractor, designated generally at D, is seen to comprise a pair of forwardly located, wide-spaced traction wheels E which are powered by an engine F located on a narrow chassis structure G extending rearwardly from adjacent one of said traction wheels and supported at the rear upon a steerable rear wheel H. The cutter and blower unit B is made up as a part of a frame, designated generally at I, adapted to be detachably mounted upon the tractor D in the manner set forth in the patent previously identified, and also as described in some detail in Patent No. 2,641,887, issued November 14, 1952, for a Row Crop Implement-Tractor Combination. Bearing in mind the disclosures of these two prior patents it is not seen that further details of the connection of the frame I and the tractor D should be of interest herein, it being obvious that with the frame so mounted the unit B along with the harvester A will be transported forwardly over the field as the tractor operates, moving in the direction to the right as viewed in Fig. 1.

The tractor engine F operates the unit B by means of a belt J by which power is taken from a pulley K on the tractor and transmitted to a pulley L on the end of a rotary support or shaft 10 extending crosswise of the frame I and serving, as will be later described, as a rotatable support for the rotor 35 making up the primary operating element of the cutter-blower unit B. The pulley L is on the end of the shaft 10 nearest the chassis G of the tractor and on the opposite end of the shaft 10 is a sprocket M over which there is a sprocket chain N operating to transmit power for operation of the harvester unit A as well as for other rotating components of the machine as will presently appear. In addition to such basic framing as is necessary for making connection to the tractor D the frame I also includes upstanding, longitudinally extending and parallel sides 11 and 12 and as is conventional in machines of this kind a feeder apron 13 operates between the sides 11—12 and over sprockets 14 upon a shaft 15 to deliver material from the harvester unit A upwardly and rearwardly toward the cutter-blower unit B. The uncut forage material, as designated at O, traveling upon said apron feeder 13 is also urged in a rearward direction and evened out transversely by means of a front feed roll 16 mounted upon a shaft 17 and having radially projected, toothed fins 18. As the material O moves off the apron feeder 13 it travels between upper and lower feed rolls 20 and 21 mounted upon shafts 22 and 23, respectively, and is urged thereby through a feed opening 24 extending across the front of a substantially cylindrical housing 25 wherein the aforesaid rotor for the cutter-blower unit operates and through which the aforesaid shaft 10 extends. The upper feed roll 20 is conventionally spring-biased in a downward direction by mechanism designated generally at 26 and at the bottom edge of the feed opening 24 there is located a shear blade, plate or ledger bar 27 secured by bolts 28 upon an angle 29 extending between said sides 11—12. Projecting forwardly above the shear blade 27 is a scraper 30 which keeps the lower feed roll 21 clean, also in the usual manner. All of the shafts 15, 17, 22 and 23 are operated in the proper direction by suitable connections to the aforesaid sprocket M and to an idler sprocket P driven by the sprocket chain N. Completing this generally conventional portion of the machine is a spout 31 which extends upwardly and rearwardly in a tangential direction from the housing 25, being connected thereto by the flanges designated at 32, and in order to make connection with the aforesaid discharge pipe C this spout 31 tapers toward the swivel connection 33 with said pipe. The taper is in a lateral direction or, to put it another way, the sides 34 of the spout converge in an upward direction as is most clearly shown in Figs. 2 and 4.

Figure 6:
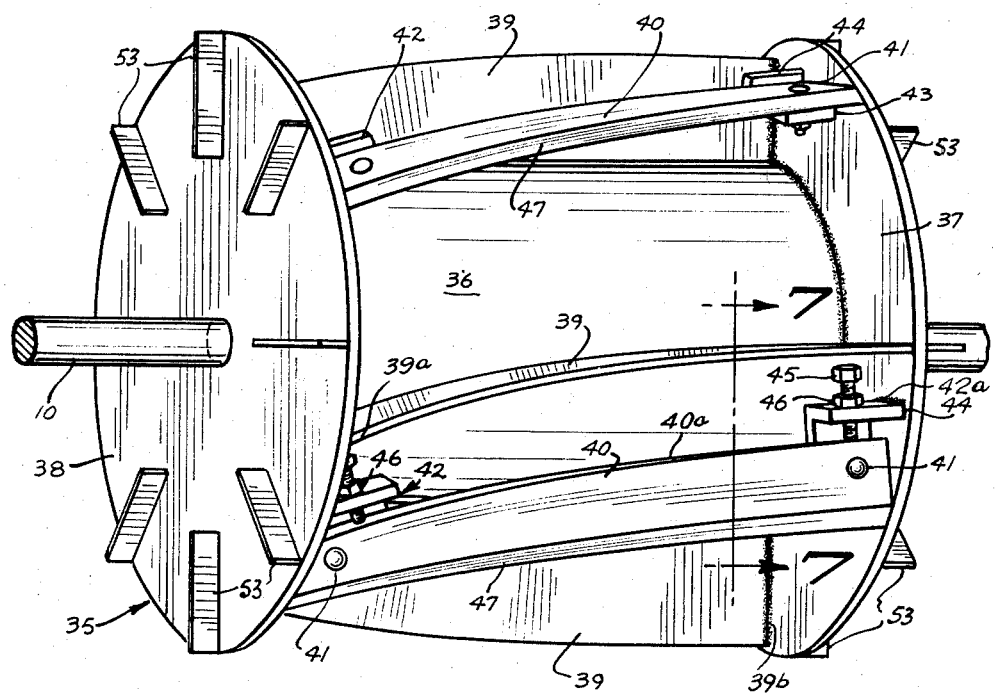
Fig. 6 is an enlarged perspective view of the rotor portion of the forage cutter and blower as removed from the rest of the machine.
Figure 7:
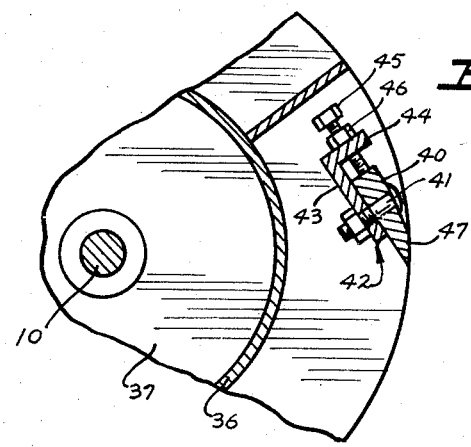
Fig. 7 is a fragmentary diametrical sectional detail view taken approximately along the line 7—7 in Fig. 6 and showing one of the blower blades and the adjacent cutting knife along with its adjustment and support.

Turning now to a more detailed description of the cutter and blower unit per se the same comprises a rotor designated generally at 35 mounted upon and rotating with the shaft 10 within the housing 25. The rotor includes a cylindrical core 36 to the ends of which are welded at 36a or otherwise suitably secured spaced apart, circular side plates 37—38, which are larger in diameter than the core and of such size as to just rotate nicely within the housing 25. Thus there is an annular space 36b around the core and between the side plates in which are located a plurality of blower blades 39 projecting outwardly from the core 36 to about the peripheral edges of the side plates 37—38 one of which is designated 37a in Fig. 3. These blades are spiral in shape with one end 39a in advance of the other with respect to the direction of rotation of the rotor, as is clearly seen in Figs. 2 and 6. The blades 39 are welded or otherwise suitably secured in place as seen at 39b in Fig. 6 and between the blades are located heavy cutting knives 40 also spiral in arrangement and secured at their ends by clamp bolts 41 to L-shaped brackets or short angles 42 welded at 42a (Fig. 6) to the inner surfaces of the side plates 37—38. Each bracket has a pair of flanges 43—44 connected at right angles and on one flange the knives are secured by the bolts 41 while through the other flange there are tapped adjusting screws 45 bearing against the back edges 40a of the knives, said screws having the usual lock nuts 46. The brackets 42 are positioned at angles to the peripheral edges of the side plates 37—38 of the rotor such that the sharpened edges 47 of the knives will project toward these peripheral edges and pass in shearing relation to the shear plate 27 as the rotor revolves, as will be clearly seen in Fig. 3. As is usual clearance is provided for the clamp bolts 41 so that by loosening same and operating the adjustment screws 45 the knives may be adjusted inwardly or outwardly to proper relationship with the shear plate 27 and the adjustment then locked by tightening the clamp bolts 41 again.

Figure 4:
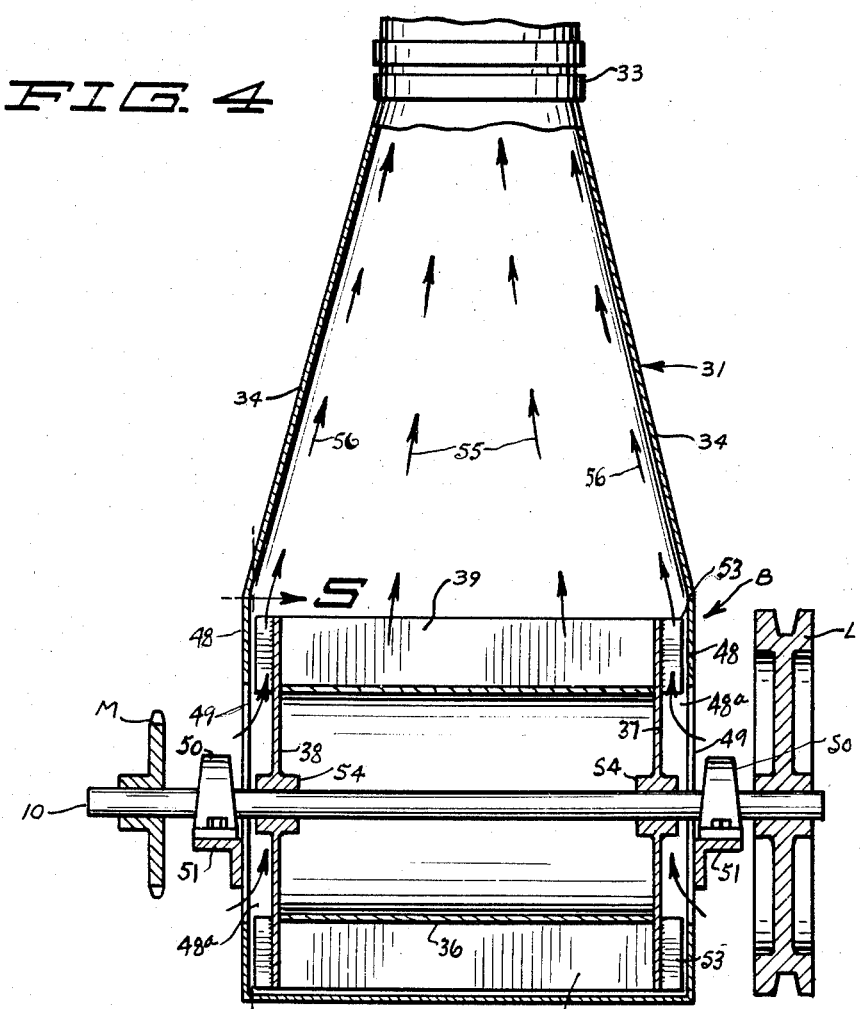
Fig. 4 is a cross sectional view taken on the angular plane indicated by the lines 4—4 in Fig. 3.

The housing 25 is wider than the frame sides 11—12 as is best seen in Fig. 2 while the width of the rotor 35 is slightly wider than the space between said sides so that the full width of the knives 40 will be exposed to and operate on the forage crop O entering the feed opening 24. The housing 25 has sides 48 spaced outwardly from the adjacent side plates 37—38 of the rotor 35 and these sides 48 have large air intake openings 49 centered about the shaft 10 which extends through said openings and, as shown in Fig. 4, is carried in self-aligning bearings 50 secured by brackets 51 to the sides 48. The top of the housing 25, forwardly of the spout 31 is provided with a removable cover 52 so that access may be readily had to the rotor 35 for adjusting the knives or performing other necessary tasks.

The lateral spaces 48a between the rotor side plates 37—38 and the adjacent sides 48 of the housing 25 open upwardly into the opposite lateral portions of the spout 31 just within the tapering sides 34 thereof (Fig. 4) and operating in these spaces are radially extending auxiliary blower blades or fins 53 welded or otherwise suitably secured upon the outer surfaces of the side plates 37—38 and peripherally spaced around the outer marginal portions thereof. The radial length of these auxiliary blower blades 53, as they are here shown, is such that they extend from the peripheral edges of the side plates 37—38 inward to points about in line with the edges of the air intake openings 49 and the width of the blades is, of course, such that they will just nicely clear the sides 48 of the housing 25. It will be noted that the side plates 37—38 are imperforate except where they are provided with hubs 54 to fit upon the shaft 10, so that the main or center blower blades 39 are substantially isolated from these outer auxiliary blower blades 53, the former thus drawing in air through the feed opening 24 while the latter receive and centrifugally discharge air from the intake openings 49.

In operation the crop material for reduction is fed into the opening 24 and the knives 40 carried by the rotor 35, in cooperation with the shear blade 27, will chop the material into short pieces as is indicated in Fig. 3. The direction of rotation of the rotor is such that the comminuted material will be carried downwardly and then by the blower action of the blades 39 will be cast upwardly through the spout 31 as is designated by the arrows 55 in Figs. 3 and 4, the material being cast out through the pipe C into a suitable transporting means by which the material is carried away for storage and use as feed. Since the full widths of the knives 40 and blower blades 39 are effective on the material the capacity and efficiency of the rotor is high by comparison with its size and because of the core 36 at the center of the rotor there are formed no dead areas or eddies in which material might tend to collect and retard the operation of the unit.

Figure 5:
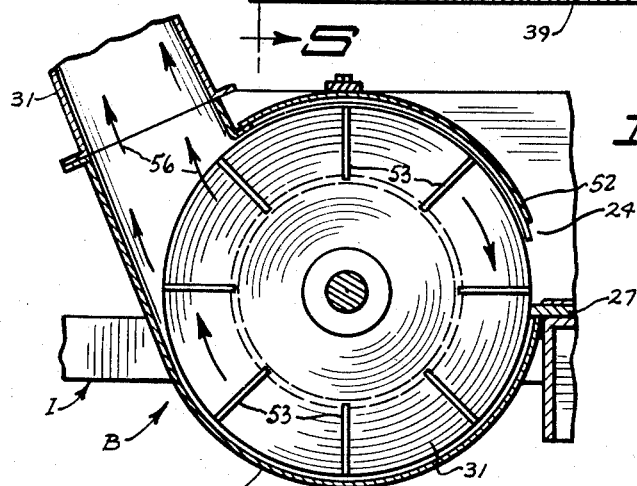
Fig. 5 is a fragmentary diametrical section taken along the line 5—5 in Fig. 4.

The function of the auxiliary blower blades 53 is important. As the rotor revolves these blades take in air from the air intake openings 49 and discharge the air in two separate streams upwardly along the inner surfaces of the converging side walls 34 of the spout, as indicated by the arrows 56 in Figs. 4 and 5. These rapidly moving, converging and laterally located air streams counteract the tendency of the center volume of air and entrained chopped forage material to eddy backward or create back currents due to the taper of the spout and thus the auxiliary blower blades are quite important to the overall operation of the cutter and blower unit.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A forage cutter and blower comprising a housing having spaced sides and a transversely extending feed opening therebetween to receive forage material to be cut, a spout having an inlet end at the housing and an outlet end to discharge cut forage material, said spout being tapered toward said outlet end, a rotatable shaft in said housing and said sides having air intake openings about said shaft, a rotor on said shaft and having spaced apart side plates spaced inwardly from the housing sides, radially extending fins on the outer surfaces of both said rotor side plates and operative as the rotor revolves to blow air currents from said air intake openings outwardly through the spout toward the outlet end thereof, and blower blades and cutting knives extending between the rotor side plates for cutting forage material and blowing the cut material out said spout.

2. A forage cutter and blower comprising a housing having spaced sides and a feed opening therebetween to receive forage material to be cut, a spout having an inlet end in the housing and an outlet end to discharge cut forage material, said spout having sides converging toward its said outlet end, a rotatable shaft in the housing and said sides having air intake openings, a rotor on said shaft and having spaced apart imperforate side plates spaced inwardly from the housing sides, radially extending fins on the outer surfaces of said rotor side plates and operative between the housing sides and said side plates as the rotor revolves to blow air currents from said air intake openings outwardly immediately within the converging sides of the spout toward the outlet end thereof, and blower blades and cutting knives extending between the rotor side plates for cutting forage material and blowing air from the feed opening and the entrained cut material out said spout.

3. A rotor and housing for a forage cutter, comprising a housing having spaced apart walls having air intake openings, a rotary shaft extending between said walls, a rotor comprising three series of center and end blower blades spaced along the axis of the shaft, a spout extending from the housing and said center blower blades discharging outward through said spout, substantially imperforate side plates on the shaft and isolating the air intake openings from all but said end blades whereby the latter will deliver separate air streams outward through said spout along the sides of the path of the air delivered by the center blower blades, and forage cutter knives also forming part of said rotor and each located in advance of one of said center blower blades.

4. In a forage cutter and blower, a housing having spaced side walls and a feed opening for forage material, a laterally tapered spout extending upwardly from the housing and having upwardly converging sides, the side walls having air intake openings, a rotatable shaft extending through said openings, a rotor mounted on the shaft and comprising spaced apart circular side plates and a cylindrical core larger than said shaft but smaller than the side plates, spiral blower blades joining the side plates about said core and operative to deliver air and entrained cut forage upward through the center of said spout, spiral cutting knives extending between the rotor side plates and positioned between said blower blades, and auxiliary blower blades located radially on the outer surfaces of the side plates and operative to direct streams of air upward from the air intake openings along the inside of the converging sides of the spout.

5. In a forage cutter and blower, a housing having spaced side walls and a feed opening for forage material, a laterally tapered spout extending upwardly from the housing and having upwardly converging sides, the side walls having air intake openings, a rotatable shaft extending through said openings, a rotor mounted on the shaft and comprising spaced apart circular and substantially imperforate side plates and a cylindrical core larger than said shaft but smaller than the side plates, spiral blower blades joining the side plates and located radially outward of said core and operative to deliver air and entrained cut forage upward through the center of said spout, spiral cutting knives extending between the rotor side plates and positioned between said blower blades, and auxiliary blower blades located radially on the outer surfaces of both of the side plates and operative to direct streams of air upward from the air intake openings along the inside of the converging sides of the spout, said core and the air intake openings being of substantially the same diameter.

References Cited in the file of this patent

UNITED STATES PATENTS

| | | |
|---|---|---|
| 140,491 | Ellis et al. | July 1, 1873 |
| 573,479 | Papke | Dec. 22, 1896 |
| 589,621 | Russell | Sept. 7, 1897 |
| 2,230,146 | Myers | Jan. 28, 1941 |
| 2,656,868 | Hintz et al. | Oct. 27, 1953 |